United States Patent [19]

Hayashi

[11] Patent Number: 5,040,031
[45] Date of Patent: Aug. 13, 1991

[54] IMAGE PROCESSING APPARATUS WHICH CAN CONTROL OUTPUT TO MULTIPLE DEVICES TO ACCOMMODATE DIFFERING OPERATING TIMING OF THOSE DEVICES

[75] Inventor: Kimiyoshi Hayashi, Kawasaki, Japan

[73] Assignee: Canon Kabushiki Kaisha, Tokyo, Japan

[21] Appl. No.: 374,573

[22] Filed: Jun. 30, 1989

Related U.S. Application Data

[63] Continuation of Ser. No. 46,097, May 5, 1987, abandoned.

[30] Foreign Application Priority Data

May 10, 1986 [JP] Japan .................................. 61-105818
May 10, 1986 [JP] Japan .................................. 61-105819

[51] Int. Cl.⁵ ............................................. G03G 15/01
[52] U.S. Cl. ..................................... 355/326; 355/204; 355/208; 355/232; 355/327; 358/296; 358/300
[58] Field of Search ............... 355/326, 327, 204, 208, 355/210, 232, 233, 244, 245; 358/78, 296, 300, 80, 400, 401, 404, 409-410, 443, 450

[56] References Cited

U.S. PATENT DOCUMENTS

| | | |
|---|---|---|
| 4,106,060 | 8/1976 | Chapman, Jr. |
| 4,110,794 | 8/1976 | Lester . |
| 4,383,277 | 5/1983 | Kubo ..................... 358/258 |
| 4,476,486 | 10/1984 | Ayata et al. ............... 358/78 |
| 4,491,873 | 1/1985 | Takayama . |
| 4,527,885 | 7/1985 | Ayata et al. ............... 355/3 R |
| 4,625,234 | 11/1986 | Yamada ..................... 358/78 |
| 4,673,990 | 6/1987 | Okada ........................ 355/14 C |
| 4,791,492 | 12/1988 | Nagashima et al. ....... 358/409 |
| 4,896,146 | 1/1990 | Narumiya ................. 358/78 X |
| 4,905,079 | 2/1990 | Hayashi ..................... 358/78 |
| 4,926,252 | 5/1990 | Nagano ..................... 358/78 X |

Primary Examiner—A. T. Grimley
Assistant Examiner—Matthew S. Smith
Attorney, Agent, or Firm—Fitzpatrick, Cella, Harper & Scinto

[57] ABSTRACT

An image processing apparatus includes a color reader for reading image signals, a multi-output memory for outputting the image signals to a plurality of color printers, a control unit for discriminating operating states of the color printers, and a sync control for performing output control of the image signals supplied to the color printers.

48 Claims, 10 Drawing Sheets

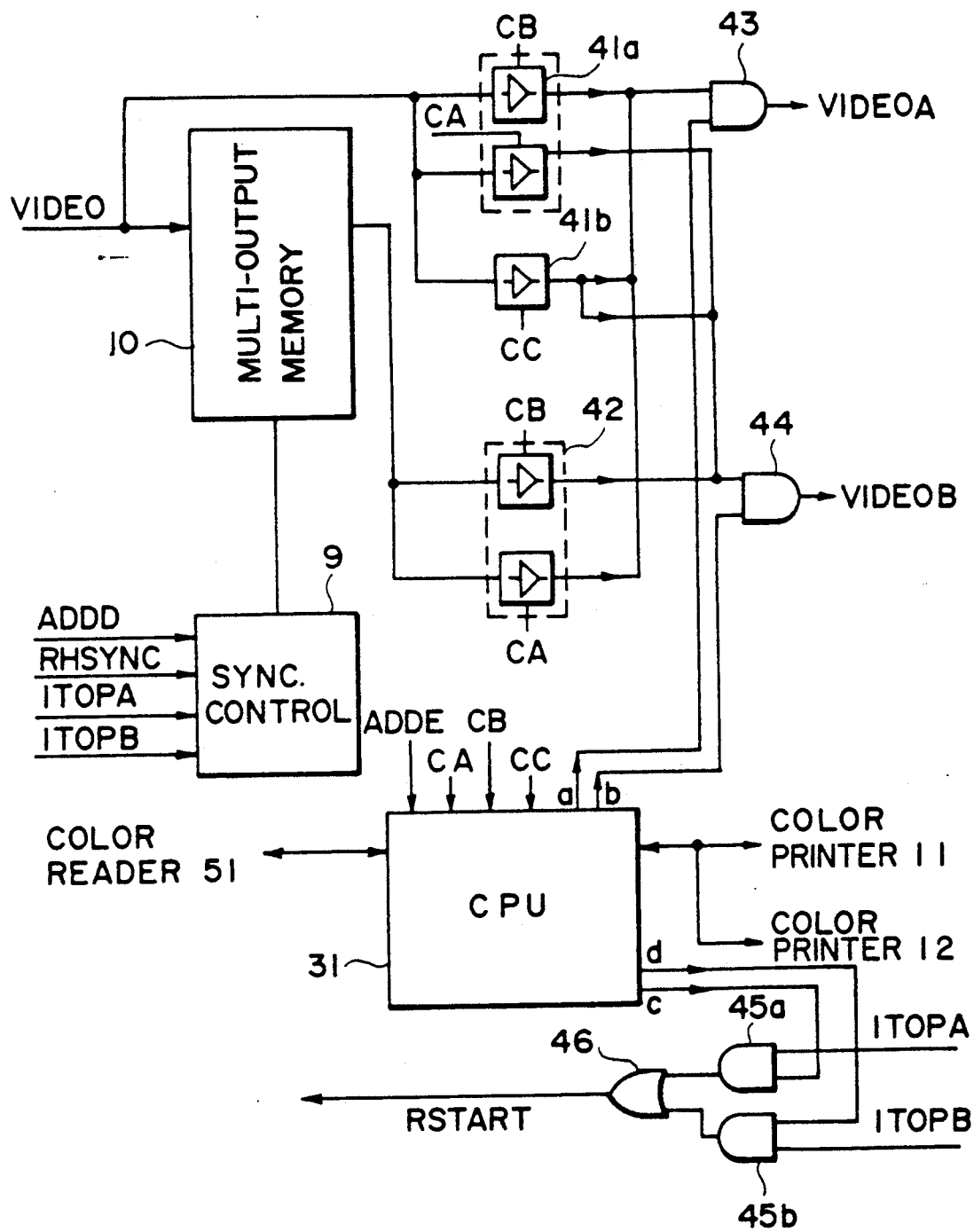
F I G. 5(a)

IMAGE PROCESSING APPARATUS WHICH CAN CONTROL OUTPUT TO MULTIPLE DEVICES TO ACCOMMODATE DIFFERING OPERATING TIMING OF THOSE DEVICES

This application is a continuation of application Ser. No. 07/046,097 filed May 5, 1987 now abandoned.

BACKGROUND OF THE INVENTION

1. Field of the Invention

The present invention relates to an image processing apparatus for processing such as image formation on the basis of a digital signal obtained by converting, e.g., an optical image into an electrical signal.

2. Related Background Art

In order to obtain a color image hard in a conventional color printer of a thermal transfer system or an electrophotographic system, color developing agents of Y (yellow), M (magenta), C (Cyan), and BK (black) are sequentially mixed according to mixing of subtractive primaries, thereby obtaining a full-color (all colors) image hard copy. In this case, the Y, M, C and BK image must be precisely aligned on a single recording medium (a recording sheet).

For this reason, when color image information read by a color image reading apparatus (i.e., a color reader) is to be sequentially printed or an image processing apparatus does not include an image memory, synchronization control for performing color image registration between the color reader and the color printer is required.

In order to obtain a plurality of color image hard copies or identical color image hard copies at different places, the color image information read by a single color reader must be supplied to a plurality of color printers.

However, if a single color reader is connected to a plurality of color printer, the following problem occurs.

After an image formation command is simultaneously input to a plurality of printers, an initial preparatory operation such as preliminary rotation must be performed at each printer for subsequent image formation. In this case, the preparatory periods required for the initial preparatory operation at different printer are often different from each other, and the recording start timings are also different from each other. If the image signal is supplied from a single reader to a plurality of printers at the same timing, supply of the image signal cannot be synchronized with the start of image recording at some printers. In order to eliminate this problem, differences in recording start timings may be absorbed by a large-capacity memory means such as a page memory. However, this arrangement undesirably results in high cost.

SUMMARY OF THE INVENTION

The present invention has been made in consideration of the above situation, and has as its object to provide an image processing apparatus capable of performing good image processing.

It is another object of the present invention to provide an image processing apparatus capable of causing a plurality of apparatuses to process identical image signals.

It is still another object of the present invention to provide an image processing system capable of causing a plurality of processing apparatuses to process an image signal generated by a single image signal generating apparatus.

It is still another object of the present invention to provide an image processing apparatus suitable for color image reproduction.

The above and other objects, features, and advantages of the present invention will be apparent from the following detailed description in conjunction with the accompanying drawings.

BRIEF DESCRIPTION OF THE DRAWINGS

FIG. 5(a) is a block diagram for explaining a control operation for sending an image signal stored in a multi-output memory;

DETAILED DESCRIPTION OF THE PREFERRED EMBODIMENT

The present invention will be described in detail with reference to a preferred embodiment.

Figure 1:
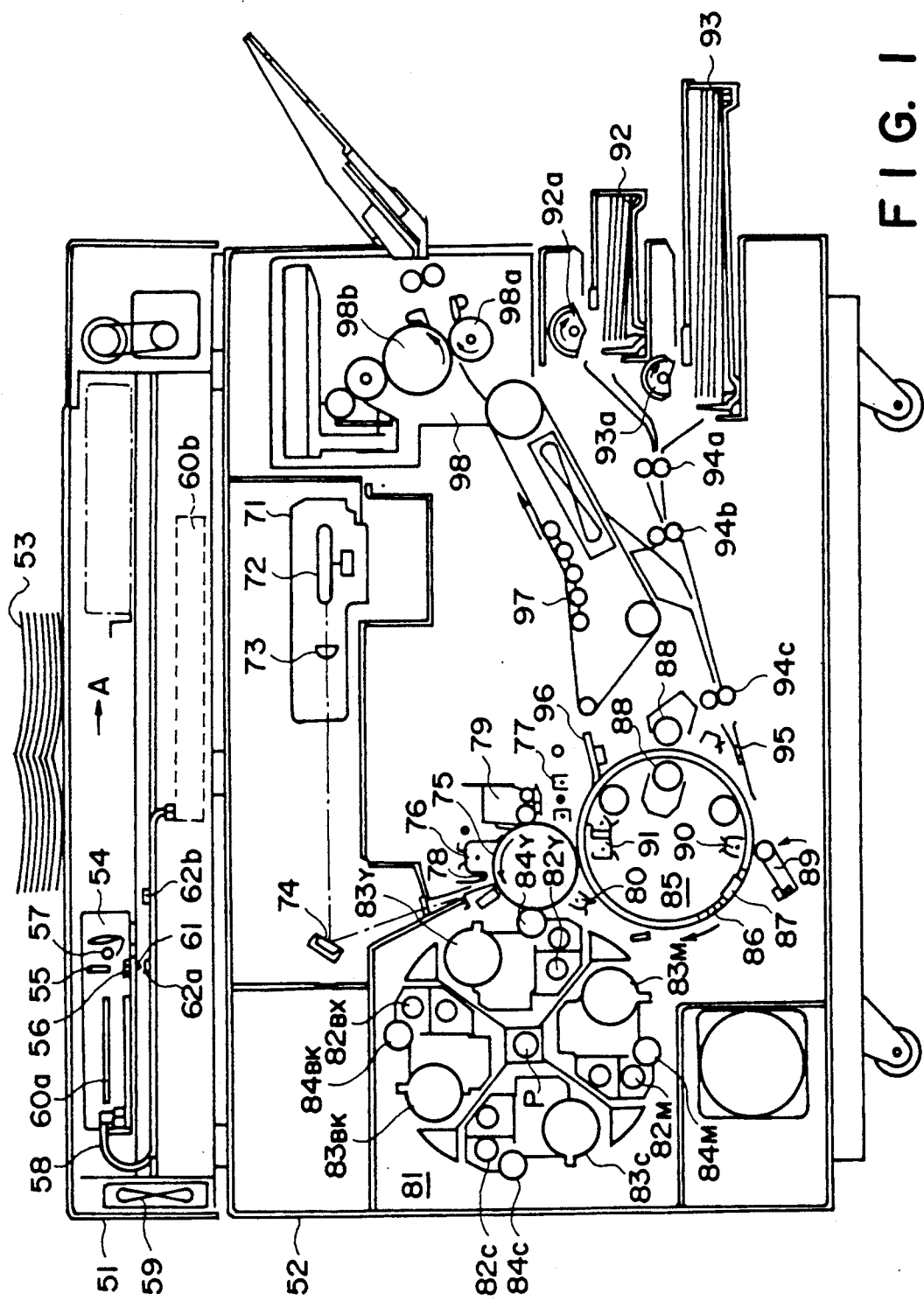
FIG. 1 is a schematic sectional view showing the overall arrangement of a color copying machine.

FIG. 1 is a sectional view showing the overall arrangement of a color copying machine. The copying machine includes a color reader 51 in the upper portion thereof and a color printer in the lower portion thereof. The color reader 51 includes a color separating means (to be described later) and a photoelectric transducer element such as a CCD line image sensor and reads color image information of an original in units of colors. The read image information is converted into electrical digital signals. The color printer 52 comprises an electrophotographic laser printer for reproducing a color image represented by the digital image signals in units of colors and superposing images of a plurality of colors on a single recording sheet in the form of digital dots.

A general description of the color reader 51 will be made below.

An original 53 is placed on an original scanning unit 54 and can be scanned thereby. The original scanning unit 54 incorporates a rod array lens 55, an equal-size type color separation line sensor (color image sensor) 56, and an exposure lamp 57. The original scanning unit 54 is connected to an image processing section 60b via a signal processing substrate or board 60a and A cooling fan 59 is arranged at the left end of the color reader 51.

When the original scanning unit 54 is moved in a direction of arrow A so as to read an image of the original 53 placed on the original table, the exposure lamp 57 in the original scanning unit 54 is turned on. Light reflected by the original 53 is guided by the rod array lens 55 and is focused on the color image sensor 56 serving as a color information read sensor. The color image sensor 56 comprises several thousands of light-receiving elements aligned in a direction perpendicular to the scanning direction of the original scanning unit 54.

The color reader 61 also includes an actuator 61 arranged below the original scanning unit 54. Position sensors 62a and 62b are arranged below the actuator 61 to detect the scanning position of the original scanning unit 54. The position sensors 62a and 62b respectively comprise microswitches or the like.

A general description of the color printer 52 will be made below.

A scanner 71 comprises a laser output unit for converting an image signal from the color reader 51 into an optical signal, a polygonal mirror 72 (e.g., an octahedron), a motor (not shown) for driving the polygonal mirror 72, and a focusing lens 73. A reflecting mirror 74 changes an optical path of the laser beam. The color printer 52 also includes a photosensitive drum 75, a primary charger 76, a separation discharger 77, an entire-surface exposure lamp 78, and a cleaner 79. The cleaner 79 recovers the residual toner which is not transferred to the recording sheet. The components 76 to 79 are located around the photosensitive drum 75.

A developing unit 81 is located to the left (FIG. 1) of the photosensitive drum 75. The developing unit 81 develops an electrostatic latent image formed in units of lines on the surface of the photosensitive drum 75 upon laser radiation. The developing unit 81 includes screws $82_Y$, $82_M$, $82_C$, and $82_{BK}$ for feeding the corresponding toners. Additional yellow, magenta, cyan, and black toners are respectively stored in toner hoppers $83_Y$, $83_M$, $83_C$, and $83_{BK}$ Developing sleeves $84_Y$, $84_M$, $84_C$, and $84_{BK}$ are brought into direct contact with the surface of the photosensitive drum 75 to develop the latent image. In this manner, the developing unit 81 is constituted by the screws $82_Y$, $82_M$, $82_C$, and $82_{BK}$, the toner hoppers $83_Y$, $83_M$, $83_C$, and $83_{BK}$, and the developing sleeves $84_Y$, $84_M$, $84_C$, and $84_{BK}$. These members are disposed around a rotating shaft P of the developing unit 81. For example, in order to form a yellow toner image, yellow toner development is performed at a position shown in FIG. 1. In order to form a magenta toner image, the developing unit 81 is rotated about the shaft P to bring the developing sleeve $84_M$ in the magenta developing unit into direct contact with the photosensitive drum 75. Developing operations in cyan and black developing cycles can be performed in the same manner as described above.

A transfer drum 85 is brought into rolling contact with the surface of the photosensitive drum 75 and holds a recording sheet to which the toner image formed on the photosensitive drum 75 is transferred. An actuator plate 86 is used to detect a position of the transfer drum 85. A position sensor 87 is designed to detect the home position of the transfer drum 85 when the actuator plate 86 is in contact with the position sensor 87. A transfer drum cleaner 88 is located around the transfer drum. A transfer drum cleaner 88 is located inside the transfer drum 85. A paper press roller 89 is in contact with the transfer drum 85 at the lower portion thereof. A recording paper attraction charger 90 is arranged inside the transfer drum 85. A transfer charger 91 is arranged inside the transfer drum 85 at an angular position opposite to that of the recording paper attraction charger 90.

Paper cassettes 92 and 93 can be attached to the right side as shown in (FIG. 1) of the color printer 52. Recording sheets having different sizes are respectively stored in the paper cassettes 92 and 93. Recording sheets can be selectively fed by paper feed rollers 92a and 93a. Timing rollers 94a to 94c control feed timings of each recording sheet. A paper guide 95 causes grippers (not shown) of the transfer drum 85 to hold the end of the recording sheet, thereby winding the recording sheet around the transfer drum 85. In this state, an image formation cycle can be initiated.

A separation pawl 96 is used to separate the recording sheet from the transfer drum 85 after the image formation cycle is completed. A conveyor belt 97 defines a paper discharge path to feed out the recording sheet separated from the transfer drum 85. An image fixing unit 98 is arranged at the upper right corner of the color printer 52 to fix the toner image on the recording sheet fed by the conveyor belt 97. The fixing unit 98 comprises a pair of heat press rollers 98a and 98b.

The image formation operation will be described with reference to FIGS. 2(a) and 2(b).

Figure 2A:
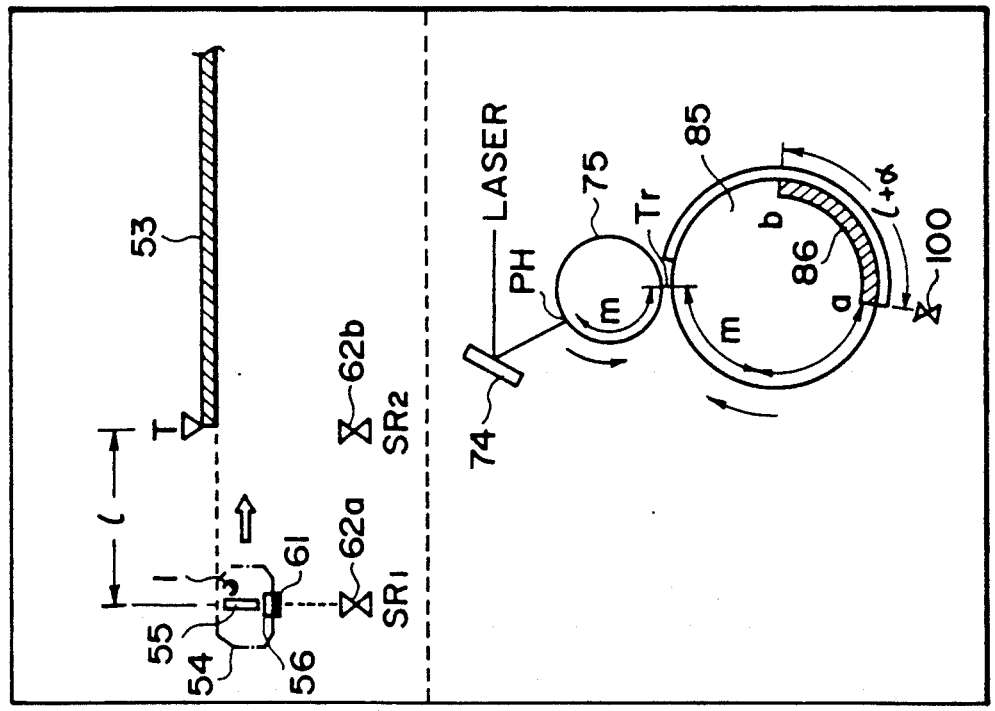
FIGS. 2(a) and 2(b) are views for explaining image formation timings.
Figure 2B:
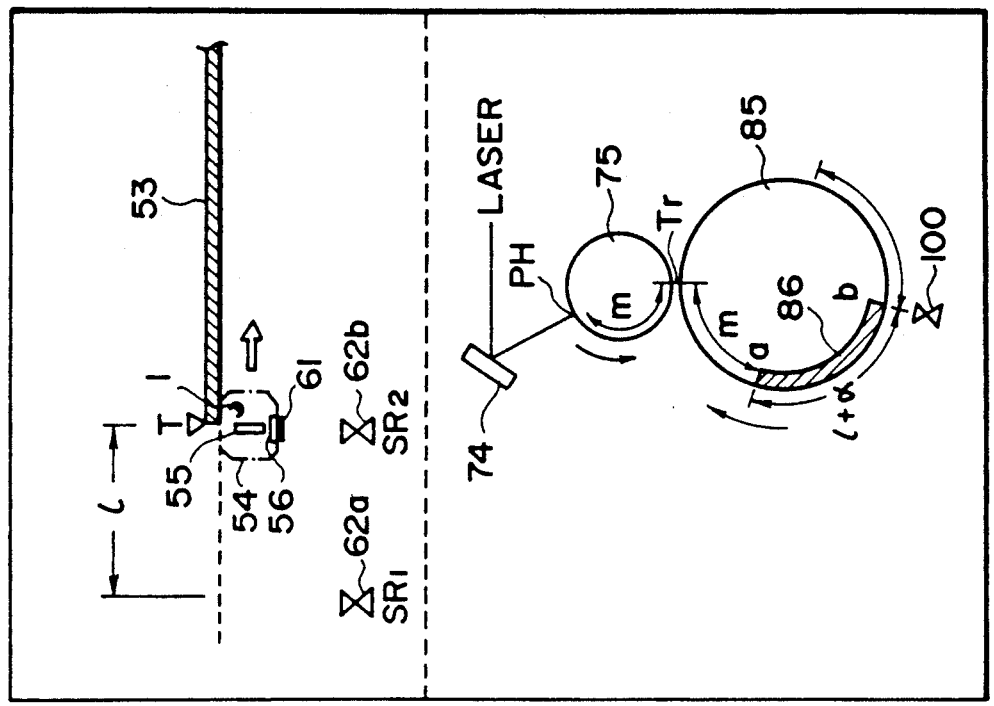

FIGS. 2(a) and 2(b) are views for explaining the image formation timings.

Referring to FIGS. 2(a) and 2(b), a leading end of the original 53 is represented by T. Light reflected by the image surface of the original 53 is guided to the color image sensor 56 through the rod array lens 55 in the original scanning unit 54. The image can be continuously read by the color image sensor 56.

The actuator 61 is mounted below the original scanning unit 54. A position signal can be generated by the position sensor (DTOP sensor) 62a and the DTOP sensor 62b which are fixed on the housing. The unit 54 is normally stopped in response to an output signal from the DTOP sensor 62a. Reading of the original is initiated in response to the output from the DTOP sensor 62b.

Image writing is performed at a laser exposure position PH on the photosensitive drum 75 in the color printer 52. A position sensor 100 (ITOP sensor) (corresponding to the position sensor 87 in FIG. 1) is fixed on the housing along the outer circumferential surface of the transfer drum 85 and the actuator plate 86 is mounted on the transfer drum 85. The leading end of the recording sheet subjected to toner image transfer is carried by the grippers at point a of the actuator plate 86. The circumferential length of the actuator plate 86 is predetermined to be $1 + \alpha$ and is slightly larger than the distance between the DTOP sensors 62a and 62b in the color reader 51.

When the leading end a of the actuator plate 86 above the transfer drum 85 rotated in the direction of an arrow (clockwise) at a constant speed is detected by the ITOP sensor 100, the original scanning unit 54 starts scanning (FIG. 2(a)). When the original scanning unit 54 reaches the DTOP sensor 62b, reading of the original is initiated. Color separation image data obtained by reading the image from the leading end T of the original is stored line by line.

In the color printer 52, when a trailing end b of the actuator plate 86 on the outer peripheral surface of the transfer drum 85 is detected, the color separation image data is read out from the beginning from a detection timing of the trailing end b. The readout data can be written on the photosensitive drum 75 with a modulated laser beam (FIG. 2(b)).

The original scanning unit 54 starts exposure/scanning at a timing when the ITOP sensor 100 detects the leading end a of the actuator plate 86 on the transfer drum 85. Image data write memory access is started at a timing when the DTOP sensor 62b detects the original scanning unit 54. Data read access is started when the ITOP sensor 100 detects the trailing end b of the actuator plate 86.

Figure 3:
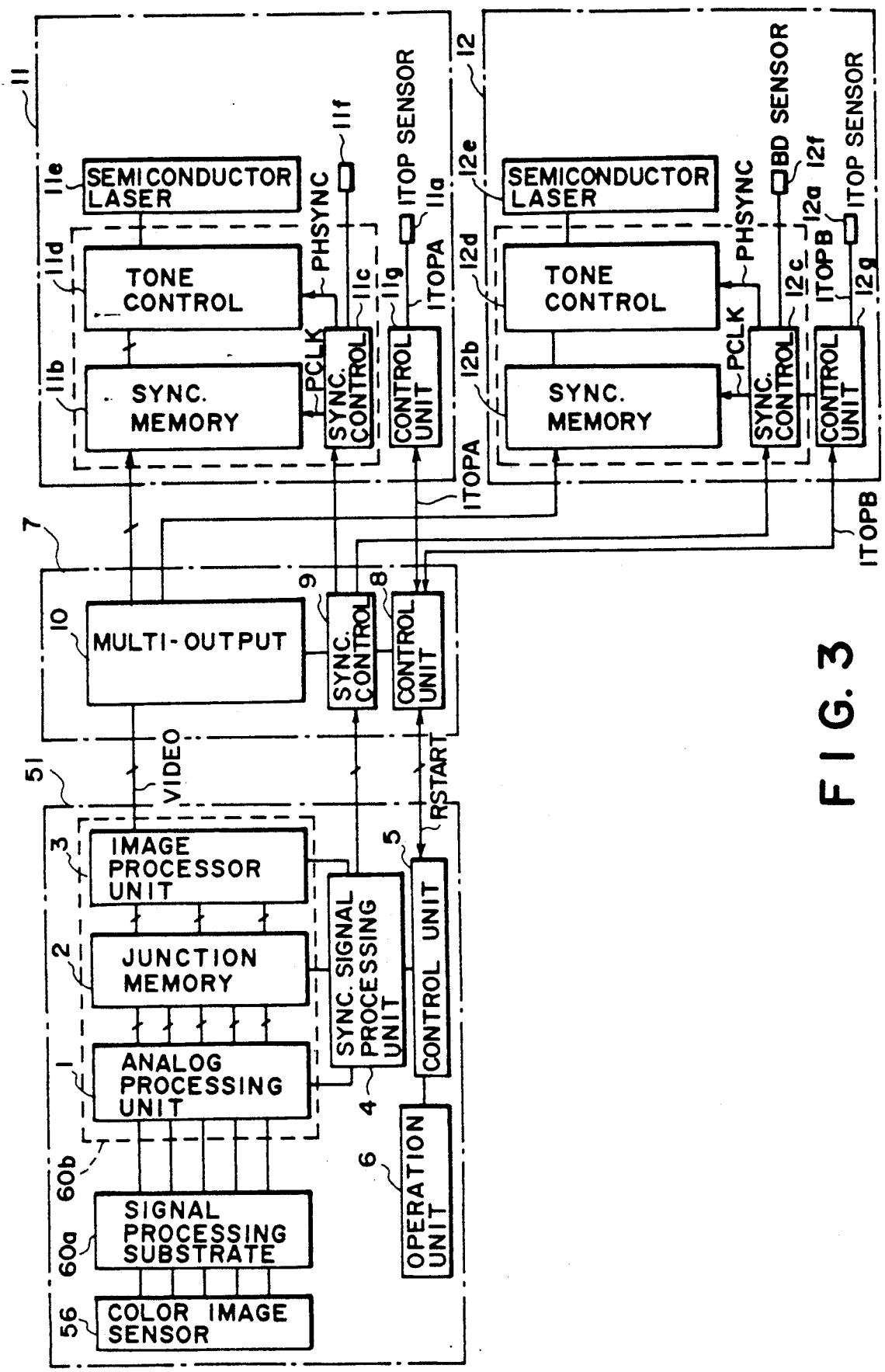
FIG. 3 is a block diagram for explaining the control arrangement of an image forming apparatus according to an embodiment of the present invention.

FIG. 3 is a block diagram for explaining the control arrangement of the image forming apparatus having color printers 11 and 12 for the color reader 51 shown in FIG. 1. The same reference numerals as in FIG. 1 denote the same parts in FIG. 3, and a detailed description thereof will be omitted.

Referring to FIG. 3, an analog processing unit 1 receives a cyan signal (C signal), a green signal (G signal), and a yellow signal (Y signal), all of which are generated in units of pixels, and generates the B(C-G) and R(Y-G) signals. Since output voltages of these signals linearly change as a function of density, the signals are converted into digital signals by, e.g., an 8-bit A/D converter built into the analog processing unit 1. A junction memory 2 is connected to the outputs of the analog processing unit 1 to combine 5-channel digital signals and join the 5-channel video signals to a 1-channel continuous digital signal within the horizontal sync signal period. An image processor unit (IPU) 3 is connected to the outputs of the junction memory 2 to perform shading for correcting variations in levels of video signals output from the junction memory 2 and masking for correcting the color tone. When shading and masking are completed in the image processing unit 3, the image processing unit 3 converts the processed signal into an image signal VIDEO having 8 bits or less. The signal VIDEO is output to a multi-output unit 7. A sync signal processing unit 4 is connected to the analog processing unit 1, the junction memory 2, and the image processor unit 3 to synchronize image processing in an image processing section 60b in accordance with an instruction from a control unit 5. An operation unit 6 is arranged on the upper surface of the color reader and the operator can enter a desired image processing mode at the operation unit 6.

The multi-output unit 7 comprises a control unit 8, a sync control 9, and a multi-output memory 10. The control unit 8 discriminates an input order of image write enable signals ITOPA and ITOPB output from ITOP sensors 11a and 12a in the color printers 11 and 12. For example, if the image write enable signal ITOPA has a priority over the image write enable signal ITOPB, the control unit 8 sends an image read start signal RSTART to the control unit 5 in the color reader 51 in response to the image write enable signal by tone control circuits 11d and 12d. The sync controls 11c and 12c output an ON/OFF signal to semiconductor lasers 11e and 12e in a scanner 71. Horizontal sync signal (BD) sensors 11f and 12f receive laser beams generated by the semiconductor lasers 11e and 12e prior to writing of an image in units of lines and output the BD signal to control units 11g and 12g.

Figure 4:
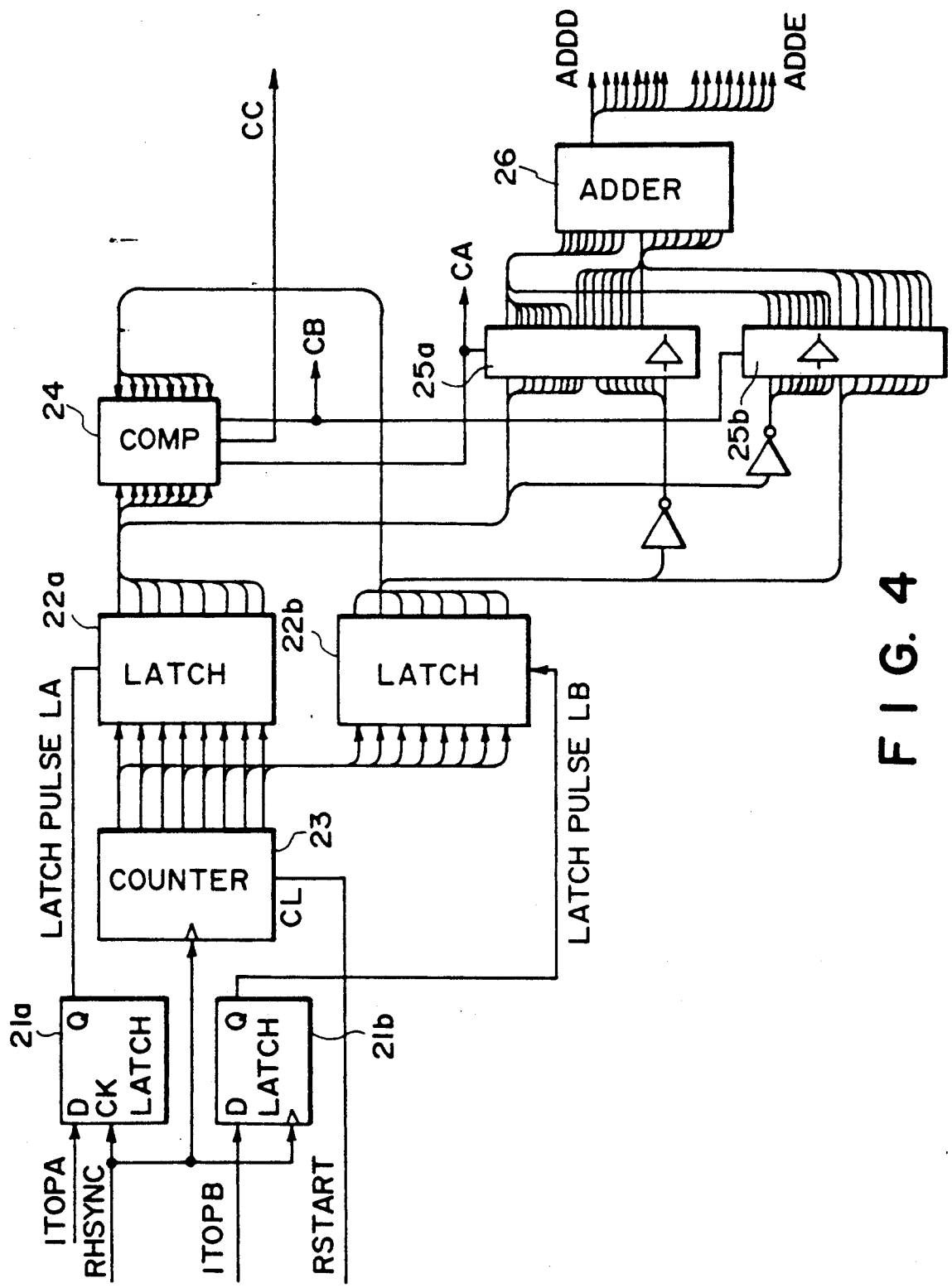
FIG. 4 is a block diagram of a control unit shown in FIG. 3.

FIG. 4 is a block diagram for explaining the arrangement of the control unit 8 built into the multi-output unit 7. The control unit 8 includes latches 21a and 21b constituted by, e.g., flip-flops. The latches 21a and 21b respectively latch the image write enable signals ITOPA and ITOPB sent from the ITOP sensors 11a and 12a in the color printers 11 and 12 in response to the horizontal sync signal RHSYNC sent from the sync signal processing unit 4 in the color reader 51. The latches 21a and 21b send latch pulses LA and LB to latches 22a and 22b, respectively. The control unit 8 also includes a counter 23 for counting pulses of the horizontal sync signal RHSYNC sent from the sync signal processing unit 4 and outputting a count signal to the latches 22a and 22b. Therefore, the counts obtained between generation of the signal RSTART and reception of the signals ITOPA and ITOPB are latched by the latches 22a and 22b. A comparator 24 receives the outputs from the latches 22a and 22b and compares them with ITOPA. The reader 51 then starts image reading and the image signals from the reader 51 are stored in the multi-output memory 10. The sync control 9 serves as a measuring/discriminating means and counts pulses of a horizontal sync signal RHSYNC generated by the color reader 51 to measure a period between reception of the image write enable signal ITOPA and reception of the image write enable signal ITOPB if the signal ITOPA has a priority over the signal ITOPB. The sync control 9 then controls transmission of the image signal VIDEO from the multi-output memory 10 serving as a correcting means to a sync memory 12b in the color printer in accordance with the count in the original image read mode. However, if the image write enable signal ITOPB has a priority over the image write enable signal ITOPA, the order of the above description is reversed. Moreover, if the image write enable signals ITOPA and ITOPB are simultaneously input, the image signal VIDEO is written in the sync memories 11b and 12b in response to the image write enable signal ITOPA or ITOPB.

Sync controls 11c and 12c generate a horizontal sync signal PHSYNC synchronized with formation of a latent image in units of lines and an image feed clock PCLK to read out the image signal VIDEO from the sync memories 11b and 12b. Known tone control processing such as dither processing is performed each other. The comparator 24 determines an output order of the image write enable signals ITOPA and ITOPB and supplies a comparison output CA, CB, or CC to the CPU 31 according to the following conditions.

If the image write enable signal ITOPA is output prior to the image write enable signal ITOPB, the comparison output CA is output. In this case, other comparison outputs CB and CC are disabled or set at logic "0". If the image write enable signal ITOPB is output prior to the image write enable signal ITOPA, the comparison output CB is output. In this case, other comparison outputs CA and CC are set at logic "0". If the image write enable signals ITOPA and ITOPB are simultaneously output, the comparison output CC is output. In this case, other comparison outputs CA and CB are set at logic "0". An output from the latch 22a and its inverted signal are respectively stored in buffers 25a and 25b, and an output from the latch 22b and its inverted signal are respectively stored in buffers 25b and 25a. An adder 26 calculates a difference between the outputs from the buffers 25a and 25b and supplies sum signals ADDE and ADDD to the control unit 8 and the sync control 9. The sum signals ADDE and ADDD represent a difference between the operating times of the color printers 11 and 12 in terms of the horizontal sync signal RHSYNC and the number of generation cycles.

It should be noted that the counter 23 is cleared in response to the image read start signal RSTART sent from the control unit 8.

FIG. 5(a) is a block diagram for explaining transmission control operation of the image data VIDEO stored in the multi-output memory 10 shown in FIG. 3. The same reference numerals as in FIG. 3 denote the same parts in FIG. 5.

Referring to FIG. 5(a), a CPU 31 serves as a data control means and is arranged in the control unit 8. The CPU 31 selectively receives the comparison outputs CA, CB, and CC as well as the sum signal ADDE. Gate circuits 41a, 41b, and 42 gate the image signal VIDEO stored in the multi-output memory 10 or the image signal VIDEO directly sent from the image processing unit 3 in the color reader 51 in response to the comparison output CA, CB, or CC and supplies the video signal VIDEO to gate circuits 43 and 44. Control signal inputs a and b are supplied from the CPU 31 to the gate circuits 43 and 44 in accordance with the comparison output CA, CB, or CC. The video signal VIDEO stored in the multi-output memory 10 or the image signal VIDEO directly sent from the image processing unit 3 is controlled and supplied to the sync memories 11b and 12b in the color printers 11 and 12. AND gates 45a and 45b mask the image read start signal RSTART for initiating image reading of the color reader 51 when the first image write enable signals ITOPA and ITOPB are respectively output from the color printers 11 and 12. Control signals c̄ and d̄ for masking the image read start signal RSTART are output from the CPU 31 to the first input terminals of AND gates 45a and 45b. Outputs from the AND gates 45a and 45b are supplied to an OR gate 46. Therefore, when one of the control signals b̄ and c̄ is output, the corresponding one of the image write enable signals ITOPA and ITOPB as the image read start signal RSTART is supplied to the reader 51.

Figure 5B:
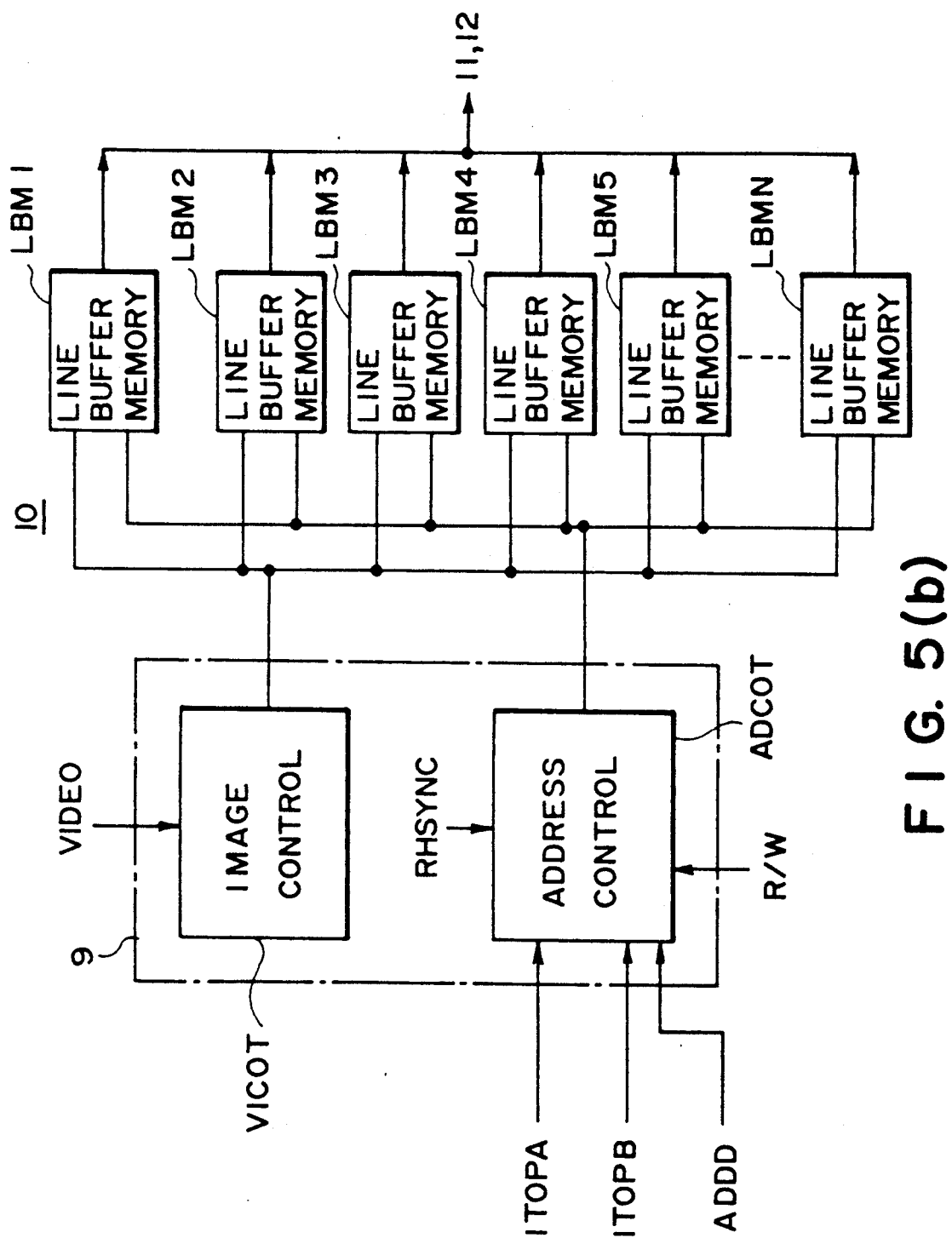
FIG. 5(b) is a detailed block diagram for explaining the relationship between a sync control and the multi-output memory.

FIG. 5(b) is a detailed block diagram for explaining the relationship between the sync control 9 and the multi-output memory 10 shown in FIG. 5(a). The same reference numerals as in FIG. 5(a) denote the same parts in FIG. 5(b).

Referring to FIG. 5(b), an address control ADCOT selects some of line buffer memories LBM1 to LBMN constituting the multi-output memory 10. The number of selected line buffer memories corresponds to the number of lines determined by a difference between the first image write enable signals ITOPA and ITOPB, i.e., the number of lines corresponding to a difference between a count of the pulses of the horizontal sync signal RHSYN until the first image write enable signal ITOPA is input and a count of the pulses of the horizontal sync signal RHSYN until the first image write enable signal ITOPB is input. An image control VICOT counts pulses of the horizontal sync signal RHSYNC and writes the image signal VIDEO from the image processing unit 3 in the color reader 51 into the selected ones (selected by the address control ADCOT) of the line buffer memories LBM1 to LBMN. The address control ADCOT assured (n+1) (1<n+1<N) lines if the difference between the first image write enable signals ITOPA and ITOPB is n.

Image formation control on the basis of the difference between the first image write enable signals ITOPA and ITOPB will be described below.

When the operator depresses a print key (not shown) in the operation unit 6, an operation command is sent from the control unit 5 in the color reader 51 to the control units 11g and 12g in the color printers 11 and 12. In the color printers 11 and 12, preparation processing including warming-up rotation of the transfer drums 85 is started. The CPU 31 shown in FIG. 5(a) outputs the control signals c̄ and d̄ to the AND gates 45a and 45b so as not to output the first image write enable signals ITOPA and ITOPB from the ITOP sensors 11a and 12a to the color reader 51. The first image write enable signals ITOPA and ITOPB output from the ITOP sensors 11a and 12a are respectively output to the latches 21a and 21b shown in FIG. 4. The horizontal sync signal RHSYNC generated by the sync signal processing unit 4 of the color reader 51 is input to the clock terminals CK of the latches 21a and 21b before the first image write enable signals ITOPA and ITOPB are sent to the latches 21a and 21b. When the first image write enable signals ITOPA and ITOPB are input to the latches 21a and 21b, the latches 21a and 21b output the latch pulses LA and LB to the next latches 22a and 22b. The count signal sent from the counter 23 is input to the latches 22a and 22b while the horizontal sync signal RHSYNC is being sent thereto. The latches 22a and 22b latch the count counted by the counter 23 operated in synchronism with the latch pulses LA and LB. The count signals are sent from the latches 22a and 22b to the comparator 24. The comparator 24 compares the count from the latch 22a with the count from the latch 22b and discriminates the output order of the image write enable signals ITOPA and ITOPB. For example, if the image write enable signal ITOPA is output prior to the image write enable signal ITOPB, the comparison output CA is output to the CPU 31 and the buffer 25a. The buffer 25a receives the output from the latch 22a and the inverted output of the latch 22b. The input to the buffer 25a is sent to the adder 26 in response to the comparison output CA. In response to the output from the buffer 25a, the adder 26 outputs, to the CPU 31, the sum signals ADDE and ADDD as a difference between the counts latched by the latches 22a and 22b. The address control ADCOT in the sync control 9 assures a predetermined number of line buffer memories LBM1 to LBMN in the multi-output memory 10 in order to store the image signal VIDEO. The second image write enable signal for initiating reading of the control unit 8, that is, the preceding image write enable signal ITOPA is output to the color reader 51 at a predetermined timing. The exposure lamp 57 is turned on in the color reader 51. The original scanning unit 54 starts scanning the original image. Light reflected by the image surface of the original is color-separated and read by the color image sensor 56. The color image sensor 56 outputs the read image as the image signal VIDEO. The image signal VIDEO is processed by the image processing unit 3 in synchronism with the horizontal sync signal RHSYNC. The processed image signal VIDEO is stored in the sync memory 11b in the color printer 11 through the multi-output unit 7 line by line. The sum signal ADDD (line difference) calculated by the adder 26 is output to the address control ADCOT in the sync control 9. If a 3-line difference is detected, the address control ADCOT assures a memory area of line buffers LBM1 to LMB4 (line number +one line) in the multi-output memory 10. The line image signals VIDEO output in synchronism with the horizontal sync signal RHSYNC are sequentially written in the line buffer memories LBM1 to LMB4, e,g., the line buffer memories LBM4, LBM3, and LBM2. In response to the next horizontal sync signal RHSYNC, a one-line image signal VIDEO1 is read out from the line buffer memory LBM4. Meanwhile, the fourth line image signal VIDE04 is written in the line buffer memory LBM1. Subsequently, the one-line image signal VIDE02 is read out from the line buffer memory LMB3. Meanwhile, the fifth line image signal VIDE05 is written in the line buffer memory LBM4 in response to the horizontal sync signal RHSYNC. In this manner, the image signals VIDEO written in the line buffer memories LBM1 to LBMN are sequentially written in the sync memory 12b in the second color printer 12, thereby forming an image in the first color mode. Thereafter, the image write enable signal ITOPA is output again from the color printer 11, and image formation in the second color mode is performed in the same manner as described above. The image write enable signals ITOPA and ITOPB of a cycle corresponding to the color mode number (entered at the operation unit 6) plus 1 are input to the AND gates 45a and 45b. Image reading is started in response to the image write enable signal ITOPA generated prior to the signal ITOPB. The image signal VIDEO of each line is sent to the color printers 11 and 12, as described above.

When the image signal VIDEO is input to the sync memories 11b and 12b of the color printers 11 and 12, the processing speed is converted in response to the horizontal sync signal PHSYNC generated by the sync controls 11c and 12c in the color printers 11 and 12 and the clock signal PCLK for sending the image signal VIDEO.

The operations of the control units 5, 8, 11g, and 12g shown in FIG. 3 will be described with reference to FIGS. 6 to 8.

Figure 6:
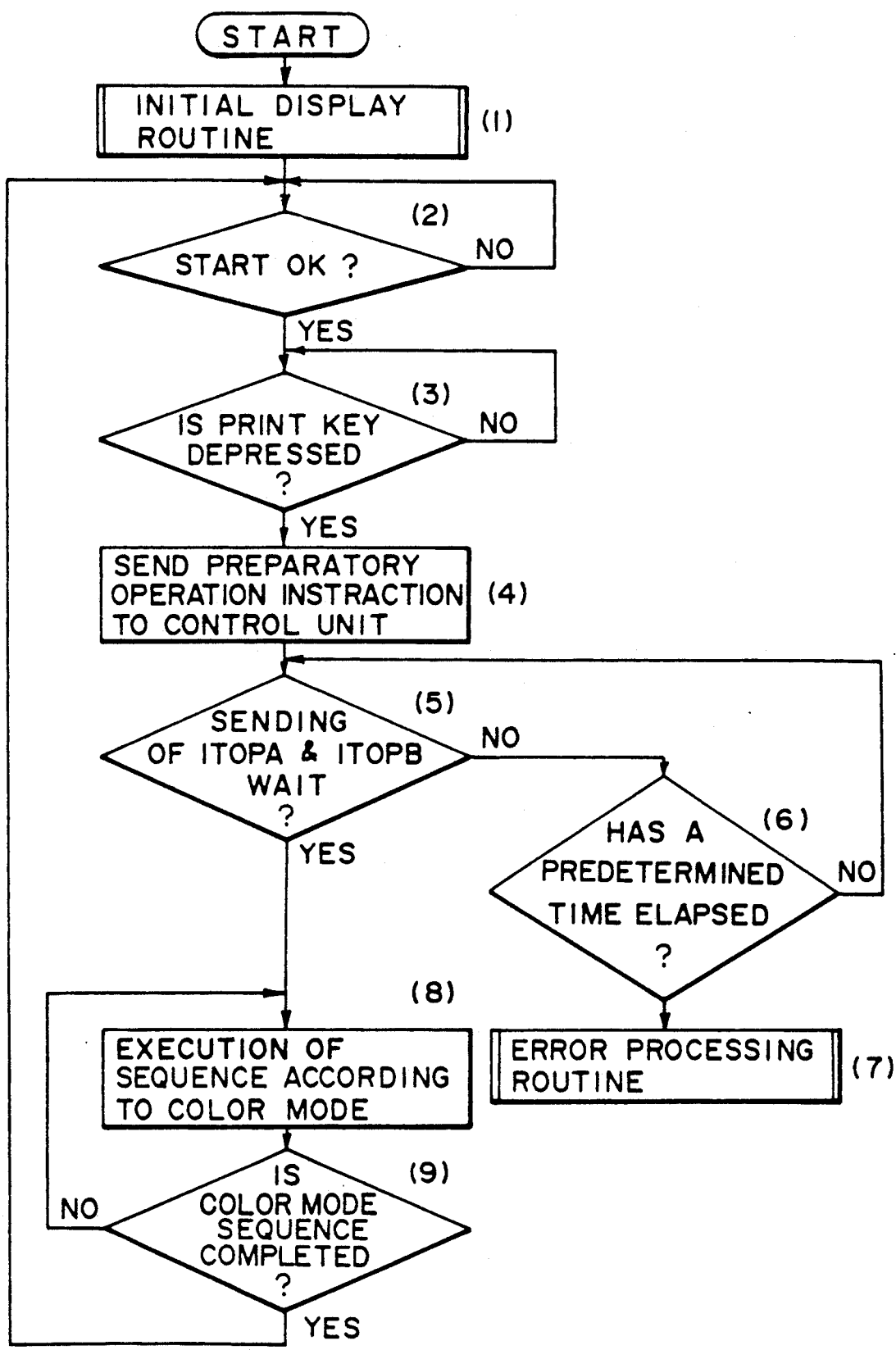
FIGS. 6 to 8 are flow charts for explaining operations of control units shown in FIG. 3, respectively.

FIG. 6 is a flow chart for explaining the operation of the control unit 5 in the color reader 51 shown in FIG. 3. Steps in the flow chart are represented by (1) to (9).

Referring to FIG. 6, an initial display routine is executed in step (1). The control unit 5 waits in step (2) until the color reader 51, the multi-output unit 7, and the color printers 11 and 12 are ready. If initialization is completed, the control unit 5 waits in step (3) until a print key (not shown) in the operation unit 6 is depressed. When the print key is depressed, the control unit 5 sends a preparatory operation command to the control unit 8 in the multi-output unit 7 and the control units 11g and 12g in the color printers 11 and 12 in step (4). The control unit 11g and 12g send a drive start signal to a drive system for the transfer drum, so that the transfer drum is rotated in the forward direction. Thereafter, the control unit 5 waits in step (5) until the ITOPB sensors 11a and 12a generate the image write enable signals ITOPA and ITOPB. If NO in step (5), the control unit 5 determines in step (6) whether the image write enable signals ITOPA and ITOPB are generated within a predetermined period of time. If NO in step (6), the flow returns to step (5). If the image write enable signals ITOPA and ITOPB are not generated, an error processing routine is executed in step (7).

However, if the control unit 5 determines in step (5) that the image write enable signals ITOPA and ITOPB are generated, a sequence according to the color mode of the multi-output unit 7 is executed in step (8). The control unit 5 determines in step (9) whether the sequence according to the color mode is completed. If NO in step (9), the flow returns to step (8). However, if YES in step (9), the flow returns to step (2).

Figure 7:
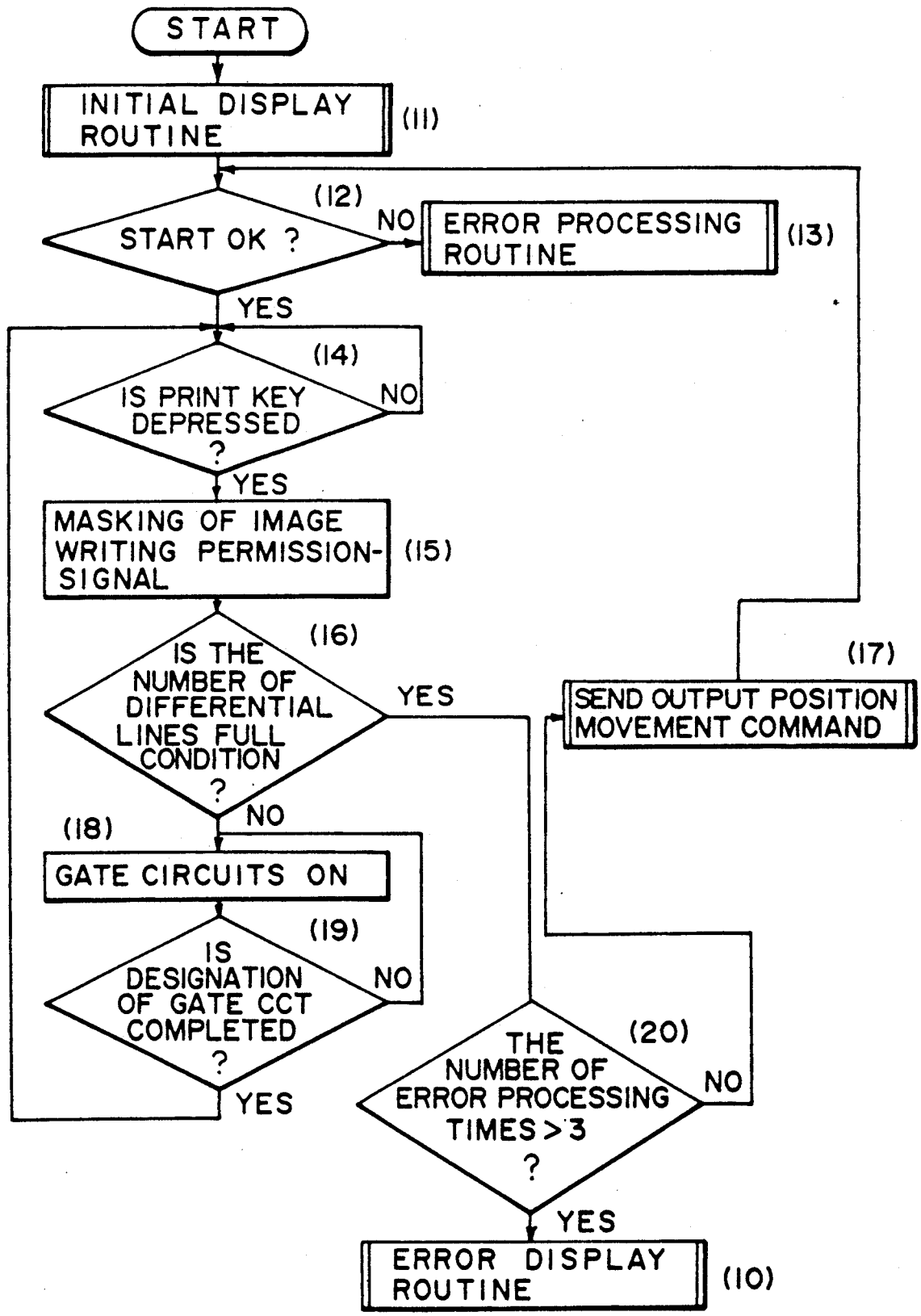

FIG. 7 is a flow chart for explaining the operation of the control unit 8 in the multi-output unit 7 shown in FIG. 3. Steps are represented by (11) to (19).

Referring to FIG. 7, the control unit 8 executes an initial display routine in step (11) and determines in step (12) whether initialization of the color reader 51, the multi-output unit 7, and the color printers 11 and 12 is properly completed. If NO in step (12), an error processing routine in step (13) is executed. However, if YES in step (12), the control unit 8 waits for depression of the print key (not shown) in the operation unit 6. The AND gates 45a and 45b are operated to mask the first image write enable signals ITOPA and ITOPB so as to prevent these signals from being sent to the color reader 51 in step (15). Subsequently, the control unit 8 determines in step (16) whether a calculated line number difference corresponds to the number of line buffer memories in the multi-output memory 10, i.e., whether the difference exceeds the LBMN number or whether the memory is full. If YES in step (16), whether the number of times of error occurrence exceeds 3 is checked in step (20). If NO in step (20), the control unit 8 outputs to the control unit 11g and 12g in the color printers 11 and 12 an error processing command for shifting the output timings of the image write enable signals ITOPA and ITOPB output from the color printers 11 and 12 in step (17). The flow returns to step (12). If the number of times of error occurrence exceeds 3, this is displayed on the operation unit 6, thereby signaling to the operator that the apparatus is inoperative. However, if the difference described above does not exceed the number of line buffer memories, the second image write enable signal, e.g., the signal ITOPA is output to the color reader 51. The gate circuits 43 and 44 are turned on in step (18) to output the image signal VIDEO corresponding to the color mode to the color printer 11 or 12. The control unit 8 then determines in step (19) whether designation of the gates 43 and 44 is completed. If NO in step (19), the flow returns to step (18). However, if YES in step (18), the flow returns to step (14).

Figure 8:
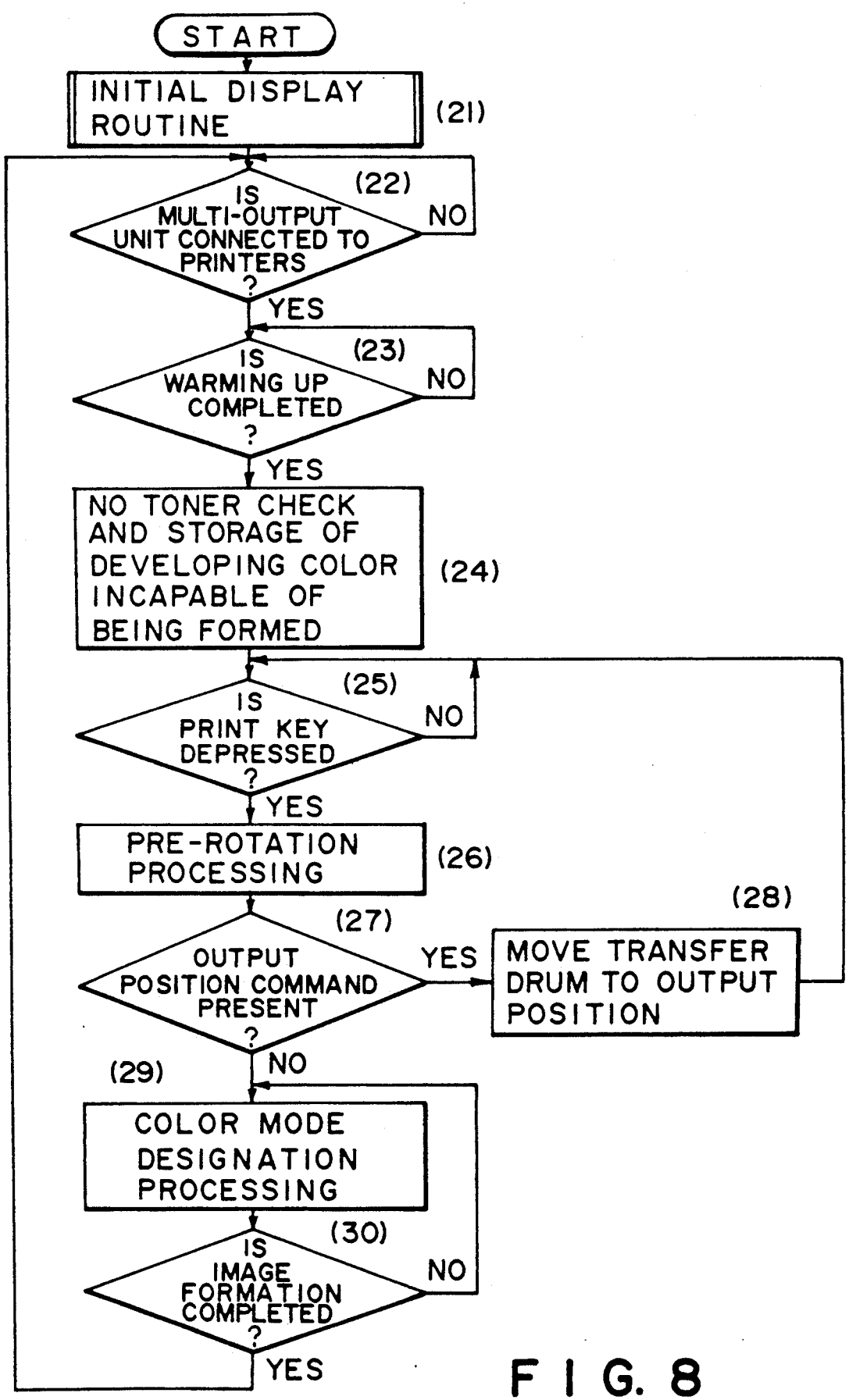

FIG. 8 is a flow chart for explaining the operation of the control units 11g and 12g in the color printers 11 and 12 shown in FIG. 3. Steps are represented by (21) to (30).

The control units 11g and 12g execute an initial display routine in step (21) and wait for electric connections of the multi-output unit 7 to the color printers 11 and 12 in step (22). If the connections are completed, the control units 11g and 12g wait for warming-up in step (23). If YES in step (23), the control units 11g and 12g check the absence of toners. The color toners which are not available in the color printers 11 and 12 are signaled and stored in internal memories (RAMs) in the control units 11g and 12g in step (24). The control units 11g and 12g wait until operator depressed the print key in step (25). If the print key is depressed, pre-rotation processing is executed in step (26). Thereafter, as described above, the image write enable signals ITOPA and ITOPB are sent to the control unit 8 in the multi-output unit 7. The control units 11g and 12g determine in step (27) whether the error processing command for shifting the output timings of the image write enable signals ITOPA and ITOPB is output. As described above, this command is generated from the multi-output unit 7 when a difference between the numbers of lines represented by the image write enable signals ITOPA and ITOPB exceeds the maximum number of lines in the line buffers in the multi-output memory 10. If the command is determined to be output, the transfer drum is moved to a position where the leading end of the actuator 86 of the transfer drum 85 is detected by the ITOP sensor 100 in step (28). The flow then returns to step (25). If the command is determined not to be output, color mode designation processing is performed in step (29). The control unit 11g and 12g determine in step (30) whether image formation according to color mode designation processing is completed. If NO in step (30), the flow returns to step (29). However, if YES in step (30), the flow returns to step (22).

Figure 9:
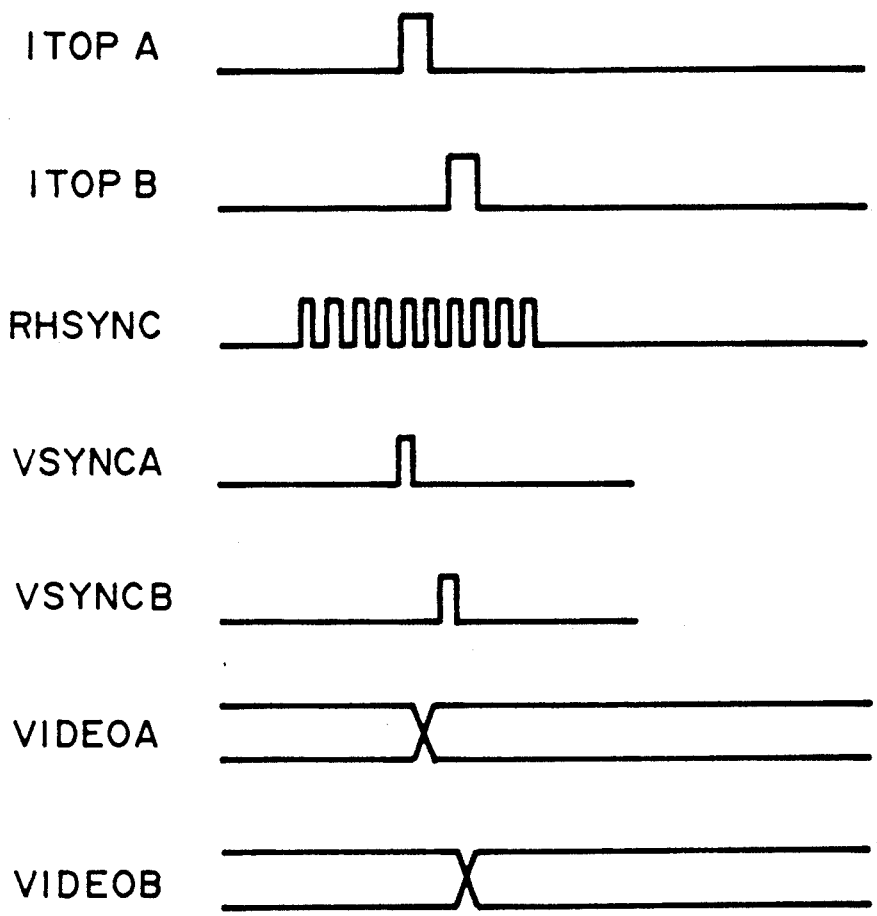
FIG. 9 is a timing chart of signals generated in the components shown in FIG. 3.

FIG. 9 is a timing chart of signals generated in the components shown in FIG. 3. The same reference symbols in FIG. 3 denote the same signals in FIG. 5.

Referring to FIG. 9 the vertical sync signals are represented by VSYNCA and VSYNDB; the image signals, VIDEOA nd VIDEOB, respectively. The image signal VIDEOA is sent to the color printer 11 in response to the vertical sync signal VSYNCA. The image signal VIDEOB is sent to the color printer 12 in response to the vertical sync signal VSYNCB. It should be noted that the image signals VIDEOA and VIDEOB are identical signals and that the image signal VIDEOB is output from the multi-output memory 10.

The difference between the numbers of lines represented by the first image write enable signals ITOPA and ITOPB is measured at the output timings thereof in the above embodiment. Image formation is not performed at the output timings of the first image write enable signals ITOPA and ITOPB. Until image formation in the preset color mode is completed, the difference between the lines is not corrected. However, whenever image formation of a predetermined color is completed, difference measurement control may serve as an interrupt operation, thereby correcting the difference again. In this case, color misregistration of the image can be greatly ameliorated.

The above embodiment exemplifies color printers. However, the present invention can be easily applied to an image forming apparatus for performing multiple transfer by winding transfer paper on the transfer drum.

In the above embodiment, the image signal VIDEO read by the color reader 51 is sent to the color printers 11 and 12. In this case, the number of printers may be N. If N printers are connected to the color reader, (N + 1) multi-output units 7 are arranged.

The apparatus according to the present invention comprises discriminating means for discriminating a temporal order of the image write enable signals sequentially output from the image forming unit, measuring means for measuring an interval up to output timing of the image write enable signal from reception of the first image write enable signal output from the discriminating means, and correcting means for correcting an image signal transfer timing, to the delayed image forming unit, of an image signal read by an image reading unit in response to the preceding image write enable signal. Therefore, the image signal read by a single reader can be optimally sent to a plurality of printers having different image output timings. A plurality of images can be simultaneously printed out at different printers, thus resulting in convenience.

In the above embodiment, printing is performed in accordance with the image signal obtained by reading the original. However, the present invention is applicable to printing in accordance with output from a word-processor or a computer. The present invention is also applicable to printing of a monochromatic image.

The present invention has been described in detail with the preferred embodiment but is not limited thereto. Various changes and modifications may be made within the scope of the appended claims.

What is claimed is:

1. An image processing apparatus comprising:
input means for inputting image signals;
output means for outputting the image signals to a plurality of devices in parallel, the image signals representing the same image;
recognizing means for recognizing lag between operating states of said plurality of devices; and
control means for controlling outputting of the image signals by said output means, said control means shifting start timings of the outputting of the image signals to each of said plurality of devices in accordance with a recognition result of said recognizing means.

2. An apparatus according to claim 1, further comprising output timing control delaying means for delaying the image signals.

3. An apparatus according to claim 1, further comprising storage means for storing therein the image signals, and wherein said control means compensates for the lag of the operating states of said plurality of devices by controlling writing and reading of the image signals into and from said storage means.

4. An apparatus according to claim 3, wherein said control means secures in said storage means a storage capacity according to the recognition result of said recognizing means.

5. An apparatus according to claim 4, wherein said storage means comprises a plurality of line memories, and said control means secures the storage capacity by selecting a number of lines of said plurality of line memories.

6. An apparatus according to claim 1, wherein said input means sequentially inputs plural color signals which signals represent a color image, and said control means sequentially controls output timings of the plural color signals.

7. An apparatus according to claim 6, wherein the recognition result applies in common to all of said plurality of devices, and wherein said control means sequentially controls the output timings of the plural color signals, in accordance with the recognition result.

8. An apparatus according to claim 1, wherein said input means reads an original image to produce the image signals.

9. An apparatus according to claim 1, wherein said plurality of devices reproduce images in response to the image signals.

10. An apparatus according to claim 1, wherein said recognizing means recognizes the lags of the operating states of said plurality of devices by generation of intervals of specific signals respectively generated from said plurality of devices.

11. An apparatus according to claim 1, wherein said output means starts the outputting of the image signals to each of said plurality of devices at a timing controlled by said control means.

12. An apparatus according to claim 1, wherein said output means further comprises delay means which delays the image signals so as to output the image signals to each of said plurality of devices at different start timings, and said control means controls delay amounts of the image signals by said delay means in accordance with the recognizing means.

13. An image processing system comprising:
a generator for generating image signals;
a plurality of image processing apparatuses for processing in parallel the image signals generated by said generator;

recognizing means for recognizing lag between operating states of said plurality of image processing apparatuses; and control means for controlling outputting of the image signals representing the same image, by said image generator, said control means shifting start timings of the outputting of the image signals to each of said plurality of image processing apparatuses in accordance with a recognition result provided by said recognizing means.

14. A system according to claim 13, further comprising output timing control delaying means for delaying the image signals.

15. An apparatus according to claim 13, further comprising storage means for storing therein the image signals, and wherein said control means compensates for the lag of the operating states of said plurality of image processing apparatuses by controlling writing and reading of the image signals into and from said storage means.

16. An apparatus according to claim 15, wherein said control means secures in said storage means a storage capacity according to the recognition result of said recognizing means.

17. An apparatus according to claim 16, wherein said storage means comprises a plurality of line memories, and said control means secures the storage capacity by selecting a number of lines of said plurality of line memories.

18. An apparatus according to claim 13, wherein said generator sequentially generates plural color signals which represent a color image and said control means sequentially controls an input timing of the plural color signals.

19. An apparatus according to claim 18, wherein the recognition result applies in common to all of said plurality of image processing apparatuses, and wherein said control means sequentially controls the output timing of the plural color signals in accordance with the recognition result.

20. An apparatus according to claim 13, wherein said generator includes reading means which reads an original image to generate the image signals.

21. An apparatus according to claim 13, wherein said plurality of image processing apparatus reproduce an image in response to the image signals.

22. An apparatus according to claim 13, wherein said recognizing means recognizes the lags of the operating states of said plurality of image processing apparatuses by generation of intervals of specific signals respectively generated from said plurality of devices.

23. An apparatus according to claim 13, wherein said control means comprises delay means which delays the image signals so as to output the image signals to each of said plurality of image processing apparatuses at different start timings, and said control means controls delay amounts of the image signals by said delay means in accordance with the recognition result of said recognizing means.

24. An image processing apparatus comprising:
input means for inputting image signals;
output means for outputting the image signals to a plurality of devices in parallel, the image signals representing the same image;
setting means for setting data relating to lag between operating states of said plurality of devices; and
control means for controlling outputting of the image signals by said output means, said control means shifting start timings of the outputting of the image signals to each of said plurality of devices in accordance with the data set by said setting means.

25. An apparatus according to claim 24, further comprising output timing control delaying means for delaying the image signals.

26. An apparatus according to claim 24, further comprising storage means for storing therein the image signals, and wherein said control means compensate for the lag of the operating states of said plurality of devices by controlling writing and reading of the image signals into and from said storage means.

27. An apparatus according to claim 26, wherein said control means secures in said storage means a storage capacity according to the data set by said setting means.

28. An apparatus according to claim 27, wherein said storage means comprises a plurality of line memories, and said control means secures the storage capacity by selecting a number of lines of said plurality of line memories.

29. An apparatus according to claim 24, wherein said input means sequentially inputs plural color signals which signals represent a color image, and said control means sequentially controls output timings of the plural color signals.

30. An apparatus according to claim 29, wherein the data set by said setting means is common to all of said plurality of devices, and wherein said control means sequentially controls the output timings of the plural signals, in accordance with the data set by said setting means.

31. An apparatus according to claim 24, wherein said input means reads an original image to produce the image signals.

32. An apparatus according to claim 24, wherein said plurality of devices reproduce images in response to the image signals.

33. An apparatus according to claim 24, further comprising recognizing means for recognizing lag of the operating states of said plurality of devices, and wherein said setting means sets the lag recognized by said recognizing means.

34. An apparatus according to claim 33, wherein said recognizing means recognizes the lags of the operating states of said plurality of devices by generation of intervals of specific signals respectively generated from said plurality of devices.

35. An apparatus according to claim 24, wherein said output means starts the outputting of the image signals to each of said plurality of image processing apparatuses at a timing controlled by said control means.

36. An apparatus according to claim 24, wherein said output means comprises delay means which delays the image signals so as to output the image signals to each of said plurality of image processing apparatuses at different start timings, and said control means controls delay amounts of the image signals by said delay means in accordance with the data set by said setting means.

37. An image processing system comprising:
a generator for generating image signals;
a plurality of image processing apparatuses for processing in parallel the image signals generated by said generator;
setting means for setting data relating to lag between operating states of said plurality of image processing apparatuses; and
control means for controlling outputting of the image signals representing the same image, by said generator, said control means shifting start timings of the outputting of the image signals to each of said plurality of image processing apparatuses in accordance with the data set by said setting means.

38. A system according to claim 37, further comprising output timing control delaying means for delaying the image signals.

39. An apparatus according to claim 37, further comprising storage means for storing therein the image signals, and wherein said control means compensates for the lag of the operating states of said plurality of image processing apparatuses by controlling writing and reading of the image signals into and from said storage means.

40. An apparatus according to claim 39, wherein said control means sequentially controls the output timings of the plural color signals, in accordance with common data of said setting means.

41. An apparatus according to claim 40, wherein said storage means comprises a plurality of line memories, and said control means secures the storage capacity by selecting a number of lines of said plurality of line memories.

42. An apparatus according to claim 37, wherein said generator sequentially generates plural color signals which represent a color image, and said control means sequentially controls an input timing of the plural color signals.

43. An apparatus according to claim 42, wherein the data set by said setting means is common to all of said plurality of image processing apparatuses, and wherein said control means sequentially controls the output timing of the plural color signals, in accordance with the data set by said setting means.

44. An apparatus according to claim 37, wherein said generator includes reading means which reads an original image to generate the image signals.

45. An apparatus according to claim 37, wherein said plurality of image processing apparatuses reproduce an image in response to the image signals.

46. An apparatus according to claim 37, further comprising recognizing means for recognizing lag of the operating states of said plurality of image processing apparatuses, and wherein said setting means sets the lag recognized by said recognizing means.

47. An apparatus according to claim 46, wherein said recognizing means recognizes the lags of the operating states of said plurality of image processing apparatuses by generation of intervals of specific signals respectively generated from said plurality of devices.

48. An apparatus according to claim 37, wherein said control means comprises delay means which delays the image signals so as to output the image signals to each of said plurality of image processing apparatuses at different start timings, and said control means controls delay amounts of the image signals by said delay means in accordance with the data set by said setting means.

* * * * *

UNITED STATES PATENT AND TRADEMARK OFFICE
CERTIFICATE OF CORRECTION

PATENT NO. : 5,040,031
DATED : August 13, 1991
INVENTOR(S) : KIMIYOSHI HAYASHI

It is certified that error appears in the above-identified patent and that said Letters Patent is hereby corrected as shown below:

On the title page: Item

[54] TITLE

"TIMING" should read --TIMINGS--.

SHEET 1 OF 10

FIG. 1, "82BX" should read --82BK--.

SHEET 7 OF 10

FIG. 6, "INSTRACTION" should read --INSTRUCTION--.

COLUMN 1

Line 5, "TIMING" should read --TIMINGS--.
Line 17, "hard" should read --hard copy--.
Line 39, "printer," should read --printers,--.
Line 45, "printer" should read --printers--.

COLUMN 2

Line 39, "color printer" should read --color printer 52--.
Line 59, "and A" should read --and a wiring cord 58. A--.

COLUMN 3

Line 3, "color reader 61" should read --color reader 51--.
Line 31, "$83_{BK}$" should read --$83_{BK}$.--.
Line 66, "as shown in (FIG. 1)" should read
--(as shown in FIG. 1)--.

UNITED STATES PATENT AND TRADEMARK OFFICE
CERTIFICATE OF CORRECTION

PATENT NO. : 5,040,031
DATED : August 13, 1991
INVENTOR(S) : KIMIYOSHI HAYASHI

It is certified that error appears in the above-identified patent and that said Letters Patent is hereby corrected as shown below:

COLUMN 6

Lines 33-34, "performed each other" should read --performed--.

COLUMN 7

Line 43, "RHSYN" should read --RHSYNC--.
Line 45, "RHSYN" should read --RHSYNC--.
Line 52, "assured" should read --selects--.
Line 63, "drums 85" should read --drum 85--.

COLUMN 8

Line 63, "DE04" should read --DEO4--.
Line 64, "VIDE02" should read --VIDEO2--.
Line 66, "VIDE05" should read --VIDEO5--.

COLUMN 9

Line 39, "control unit 11g and 12g" should read --control units 11g and 12g--.

COLUMN 10

Line 13, "control unit 11g and 12g" should read --control units 11g and 12g--.
Line 46, "depressed" should read --depresses--.
Line 66, "control unit 11g and 12g" should read --control units 11g and 12g--.

UNITED STATES PATENT AND TRADEMARK OFFICE
CERTIFICATE OF CORRECTION

PATENT NO. : 5,040,031
DATED : August 13, 1991
INVENTOR(S) : KIMIYOSHI HAYASHI

It is certified that error appears in the above-identified patent and that said Letters Patent is hereby corrected as shown below:

COLUMN 11

Line 7, "VSYNDB;" should read --VSYNCB;--.
    Line 8, "nd" should read --and--.

COLUMN 13

Line 14, "An apparatus" should read --A system--.
    Line 21, "An apparatus" should read --A system--.
    Line 25, "An apparatus" should read --A system--.
    Line 30, "An apparatus" should read --A system--.
    Line 33, "input" should read --output--.
    Line 35, "An apparatus" should read --A system--.
    Line 41, "An apparatus" should read --A system--.
    Line 44, "An apparatus" should read --A system--.
    Line 45, "apparatus" should read --apparatuses--.
    Line 47, "An apparatus" should read --A system--.
    Line 51, "devices." should read --image processing
              apparatuses.--.
    Line 52, "An apparatus" should read --A system--.

COLUMN 14

Line 9, "compensate" should read --compensates--.
    Line 30, "signals," should read --signals--.
    Line 68, "signals" should read --signals,--.

COLUMN 15

Line 8, "An apparatus" should read --A system--.
    Line 16, "An apparatus" should read --A system--.

UNITED STATES PATENT AND TRADEMARK OFFICE
CERTIFICATE OF CORRECTION

PATENT NO. : 5,040,031
DATED : August 13, 1991
INVENTOR(S) : KIMIYOSHI HAYASHI

It is certified that error appears in the above-identified patent and that said Letters Patent is hereby corrected as shown below:

COLUMN 15

Line 20, "An apparatus" should read --A system--.
Line 25, "An apparatus" should read --A system--.
Line 29, "input" should read --output--.

COLUMN 16

Line 1, "An apparatus" should read --A system--.
Line 7, "An apparatus" should read --A system--.
Line 10, "An apparatus" should read --A system--.
Line 13, "An apparatus" should read --A system--.
Line 18, "An apparatus" should read --A system--.
Line 22, "devices." should read --image processing apparatuses.--.
Line 23, "An apparatus" should read --A system--.

Signed and Sealed this

Twentieth Day of April, 1993

Attest:

MICHAEL K. KIRK

*Attesting Officer*   Acting Commissioner of Patents and Trademarks